United States Patent [19]

Rich

[11] E Re. 30,523

[45] Reissued Feb. 24, 1981

[54] SKI LOCK APPARATUS

[76] Inventor: Edward L. Rich, 3980 Peppermill La., Bay City, Mich. 48706

[21] Appl. No.: 943,541

[22] Filed: Sep. 18, 1978

Related U.S. Patent Documents

Reissue of:

[64] Patent No.: 4,020,661
Issued: May 3, 1977
Appl. No.: 624,069
Filed: Oct. 20, 1975

[51] Int. Cl.[2] ..... E05B 73/00

[52] U.S. Cl. ..... 70/58; 280/814

[58] Field of Search ..... 280/11.37, 11.37 A, 280/11.37 K, 11.37 C; 70/58-62, 19; 248/226 B, 316 A, 117.2, 117.5

[56] References Cited

U.S. PATENT DOCUMENTS

| | | | |
|---|---|---|---|
| 2,497,797 | 2/1950 | Rogers | 70/58 |
| 2,500,375 | 3/1950 | Parker | 70/58 X |
| 3,204,902 | 9/1965 | David | 248/226 B |
| 3,209,970 | 10/1965 | Canell | 280/11.37 K |
| 3,650,130 | 3/1972 | Thompson | 70/58 |
| 3,753,359 | 8/1973 | Frey | 280/11.37 A |

FOREIGN PATENT DOCUMENTS

| | | | |
|---|---|---|---|
| 72124 | 5/1947 | Norway | 280/11.37 A |
| 13839 | of 1894 | United Kingdom | 70/58 |

*Primary Examiner*—Richard E. Moore
*Attorney, Agent, or Firm*—Learman & McCulloch

[57] ABSTRACT

Ski locking apparatus for attachment to a pair of skis arranged back-to-back comprises a pair of U-shaped body members each of which has parallel legs extending from a web. The legs of one member are shaped to embrace the legs of the other member. A latch bolt located between the legs of both members spans the distance between the webs and is secured at one of its ends to one of the webs and is anchored at its other end to the other of the webs.

8 Claims, 5 Drawing Figures

SKI LOCK APPARATUS

Matter enclosed in heavy brackets [ ] appears in the original patent but forms no part of this reissue specification; matter printed in italics indicates the additions made by reissue.

This invention relates to portable locking apparatus for enabling a skier to protect his skis against theft while he is in a warming hut or the like.

It is common practice for a skier to interrupt his skiing at intervals to rest, take shelter, have lunch, or the like. On these occasions it is not always possible for the skier to keep his skies either with him or in sight and, as a result, it is not uncommon for ski thefts to occur. The theft of a pair of skies may be discouraged to a large extent if the skis are locked together. There are many different kinds of ski locking devices offered to sale, but most such devices have disadvantages associated therewith. For example, some of the currently available locking devices cannot be applied to skis of different size. In addition, some of the ski locks do not include means for securing the locked skis to a permanent structure. In addition, some of the known ski locks are heavy, cumbersome, and awkward to use.

An object of this invention is to provide a ski lock which overcomes the disadvantages of known ski locks.

Another object of the invention is to provide a ski lock which is adaptable to the skis of all lengths, widths, and thicknesses.

A further object of the invention is to provide a ski lock of the character described which is light in weight, compact, and simple to use.

Other objects and advantages of the invention will be pointed out specifically or will become apparent from the following description when it is considered in conjunction with the appended claims and the accompanying drawings, in which:

Figure 1:
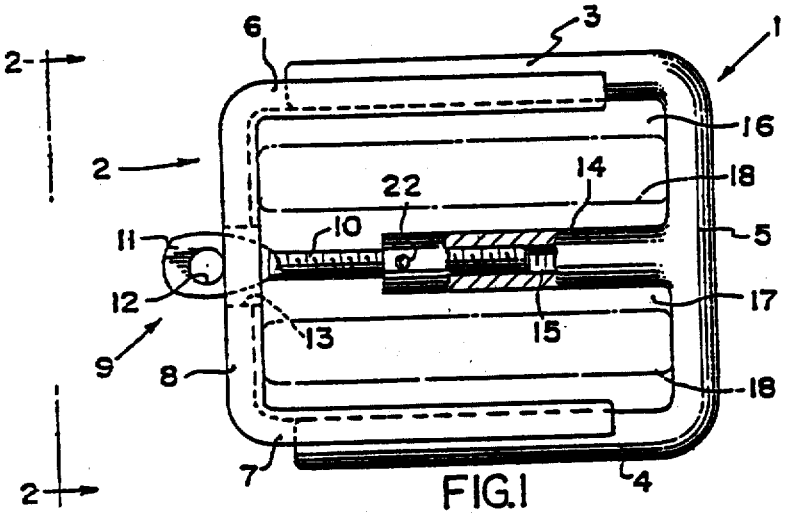
FIG. 1 is a plan view, with parts broken away, of a ski lock constructed in accordance with one embodiment of the invention and fitted to a typical pair of skis.
Figure 2:
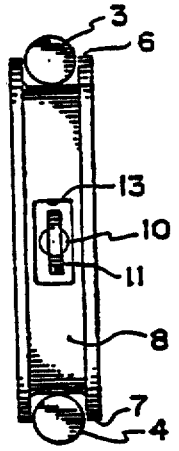
FIG. 2 is an end elevational view of the ski lock as viewed in the direction of the arrows 2—2 of FIG. 1.

A ski lock constructed in accordance with the embodiment shown in FIGS. 1–4 comprises a pair of U-shaped body members 1 and 2. The body 1 has a pair of substantially cylindrical, parallel legs 3 and 4 which extend from a web 5 joined to corresponding ends of the legs. The opposite ends of the legs are free. The body 2 has a pair of parallel, substantially channel-shaped legs 6 and 7 which extend from a substantially channel-shaped web 8 that is joined to corresponding ends of the legs 6 and 7. The opposite ends of the legs 6 and 7 are free and the spacing between the legs 6 and 7 is sufficiently less than the spacing between the legs 3 and 4 of the body 1 to enable the legs 6 and 7 to nest with or embrace the legs 3 and 4.

The apparatus includes a latch bolt 9 having a threaded stem 10 which terminates at one end in a elongate, flattened head 11 in which is an opening 12. The web has a centrally located opening 13 therein of such width as to accommodate the stem 10 and of such length as to accommodate the head 11. The width of the opening 13, however, although greater than the thickness of the head 11, is less than the width of the head for a purpose presently to be explained.

Extending from the web 5 is a tubular socket 14 having an internally threaded bore 15 in alignment with the opening 13. The socket 14 is adapted to receive the threaded stem 10 of the latch bolt.

The socket 14 is positioned substantially midway between the legs 3 and 4 of the body 1, and the opening 13 in the web of the body 2 is similarly positioned. Thus, when the legs of the respective bodies are nested, as illustrated in FIG. 1, the socket 14, together with the nested legs, provide open chambers 16 and 17 on opposite sides of the socket for reception of a pair of skis 18. The width of each chamber 16 and 17 is so selected as to be capable of accommodating a ski of substantial thickness.

Most skis are arched so that their bottoms are concave, and such arching provides a space between the back-to-back skis in which the socket 14 may be accommodated. Conventional skis also are narrowest at a zone between their shovels and the bindings, and it is at this zone that the locking apparatus is intended to be applied to the skis.

To condition the lock for application to a pair of skis, the latch bolt 9 is rotated to a position in which the flat head 11 is coplaner with the opening 13 in the web 8, whereupon the body member 2 may be moved to the left, as viewed in FIG. 1, and separated from the body 1. The member 1 then may be fitted onto both skis 18 between their bindings and shovels with the socket 14 interposed between the skis. The body member 2 then may be reassembled in nesting relation with the body 1 so that the skis 18 are engaged on opposite sides by webs 5 and 8, respectively, and are trapped between the socket 14 and the nested legs of the bodies.

Figure 3:
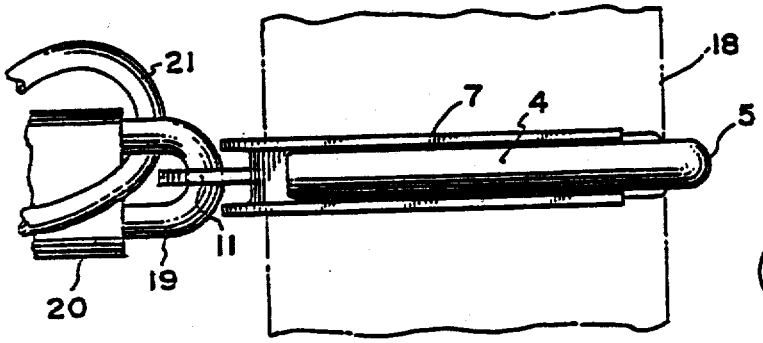
FIG. 3 is a side elevational view of the apparatus shown in FIG. 1 and with a padlock and cable fitted thereto.
Figure 4:
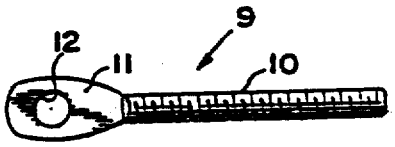
FIG. 4 is a plan view of the latchbolt forming part of the apparatus shown in FIG. 1.

Prior to the final nesting of the body members 1 and 2, the latch bolt 10 is adjusted longitudinally of the socket 14 so that, when the webs 5 and 8 engage the opposite sides of the skis 18, the head 11 will occupy the opening 13, as is shown in FIGS. 1 and 3. In this position of the head 11, the bolt 9 cannot be rotated because of interference between the head 11 and the edges of the opening 13.

Following assembly of the bodies 1 and 2 on the skis 18, the hasp 19 of the padlock 20 may be fitted through the opening 12 in the bolt head 11. The relative positions of the head 11 and the web 8 should be such that the hasp 19 prevents separation of the members 1 and 2, and the relative positions of the webs 5 and 8 should be such that they engage the edges of the skis 18 so as to prevent relative movement of the webs 5 and 8 toward one another a distance sufficient to enable the head 11 to be rotated. In thses positions of the parts, the bolt is securely anchored to the webs 5 and 8 and the lock is securely attached to the skis 18.

If desired, a cable 21 may be passed through the hasp 19 of the padlock to provide means for anchoring the locked skis to a permanent structure such as a tree.

To disengage the lock from the skis 18, the hasp 19 is removed from the bolt head 11, whereupon the body members 1 and 2 may be separated from one another. The body members 1 and 2 then may be reassembled with one another and placed in the skier's pocket.

To guard against inadvertent loss of the latch bolt 9 when the lock is not engaged, the socket 14 may be dimpled as at 22 so as to provide a frictional resistance to rotation of the bolt.

Figure 5:
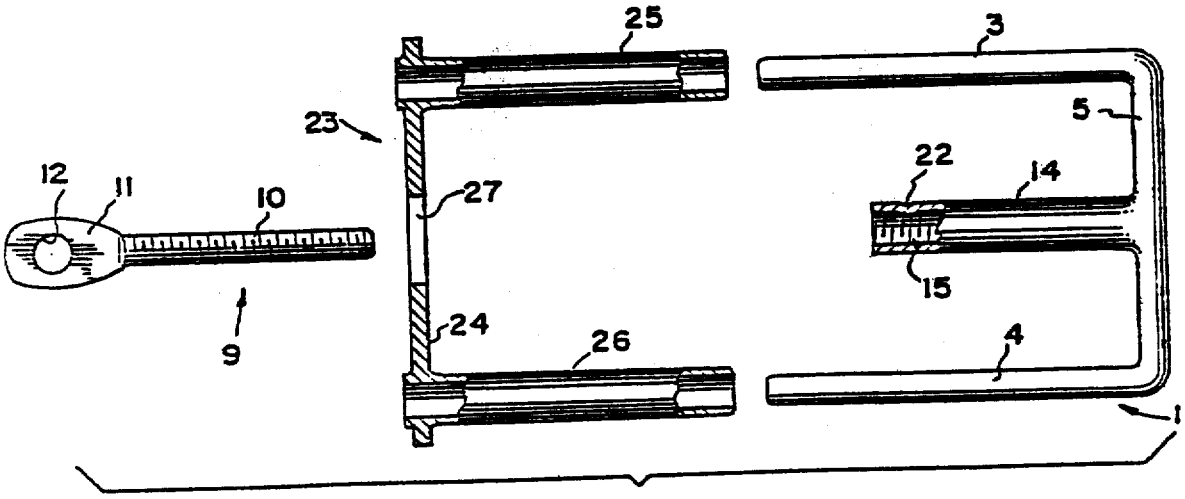
FIG. 5 is an exploded plan view, with parts broken away, of a modified embodiment.

The embodiment illustrated in FIG. 5 is the same as that previously described except that the body member 2 is replaced by a U-shaped body 23 having a flat web 24 joined at its opposite ends to a pair of tubular arms 25 and 26 which are of such diameter as telescopingly to embrace the arms 3 and 4 of the body member 1. The tubular arms 25 and 26 are open at both ends thereof, thereby enabling the arms 3 and 4 to pass completely through the arms 25 and 26. The web 24 has an opening 27 therein which corresponds to the opening 13 and which cooperates with the latch bolt 9 in the same manner as previously has been described.

The disclosed embodiments are representative of presently preferred forms of the invention, but are intended to be illustrative rather than definitive thereof. The invention is defined in the claims.

I claim:

1. Lock apparatus adapted for mounting on a pair of skis and comprising assembled first and second U-shaped body members, said first body member having spaced apart, substantially parallel legs joined at corresponding ends by a web, said second body member having spaced apart, substantially parallel legs joined at corresponding ends by a web, the legs of each of said body members being shorter in length than the width of the said skis, the legs of one of said body members slidably embracing the legs of the other of said body members, and said webs being spaced apart by the legs of said body members, the combined lengths of the respective legs being at least as great as the width of said skis; an elongate anchor member rigidly fixed to one of said webs between the legs of the latter and projecting from said one of said webs toward the other of said webs, said anchor member having a length less than that of the legs of said one of said webs, said other of said webs having an opening therein in alignment with said anchor member; an elongate latchbolt one end of which is in threaded, axially adjustable engagement with said anchor member and extending in prolongation thereof toward said other of said webs; and a head carried by said latchbolt at its outer end and extending through said opening in said [outer] *other* of said webs, said [web] *head* being of such size and shape relative to said opening as to be slidably but non-rotatably accommodated in said opening.

2. Apparatus according to claim 1 wherein the legs of one of said body members are channel-shaped.

3. Apparatus according to claim 1 wherein the legs of said body members are tubular.

4. Apparatus according to claim 1 wherein said threaded member comprises a socket into which said one end of said latchbolt extends.

5. Apparatus according to claim 4 wherein said socket is deformed and exerts a frictional force on said latchbolt.

6. Apparatus according to claim 1 wherein said opening and said head are of such dimensions that said head may pass through said opening in only a single relative position of said head and said opening.

7. Apparatus according to claim 6 wherein said head is elongate so as to occupy said opening and project beyond said other web, said head having an aperture therein for the accommodation of a hasp.

*8. Lock apparatus adapted for mounting on a pair of skis and comprising assembled first and second U-shaped body members, said first body member having spaced apart, substantially parallel legs joined at corresponding ends by a web, said second body member having spaced apart, substantially parallel legs joined at corresponding ends by a web, the legs of each of said body members being shorter in length than the width of the said skis, the legs of one of said body members slidably embracing the legs of the other of said body members, and said webs being spaced apart by the legs of said body members, the combined lengths of the respective legs being at least as great as the width of said skis; an elongate anchor member rigidly fixed to one of said webs between the legs of the latter and projecting from said one of said webs toward the other of said webs, said other of said webs having an opening therein in alignment with said anchor member; an elongate latchbolt one end of which is in threaded, axially adjustable engagement with said anchor member and extending in prolongation thereof toward said other of said webs; and a head carried by said latchbolt at its outer end and extending through said opening in said other of said webs, said head being of such size and shape relative to said opening as to be slidably but non-rotatably accommodated in said opening.*

* * * * *